Figure 1:
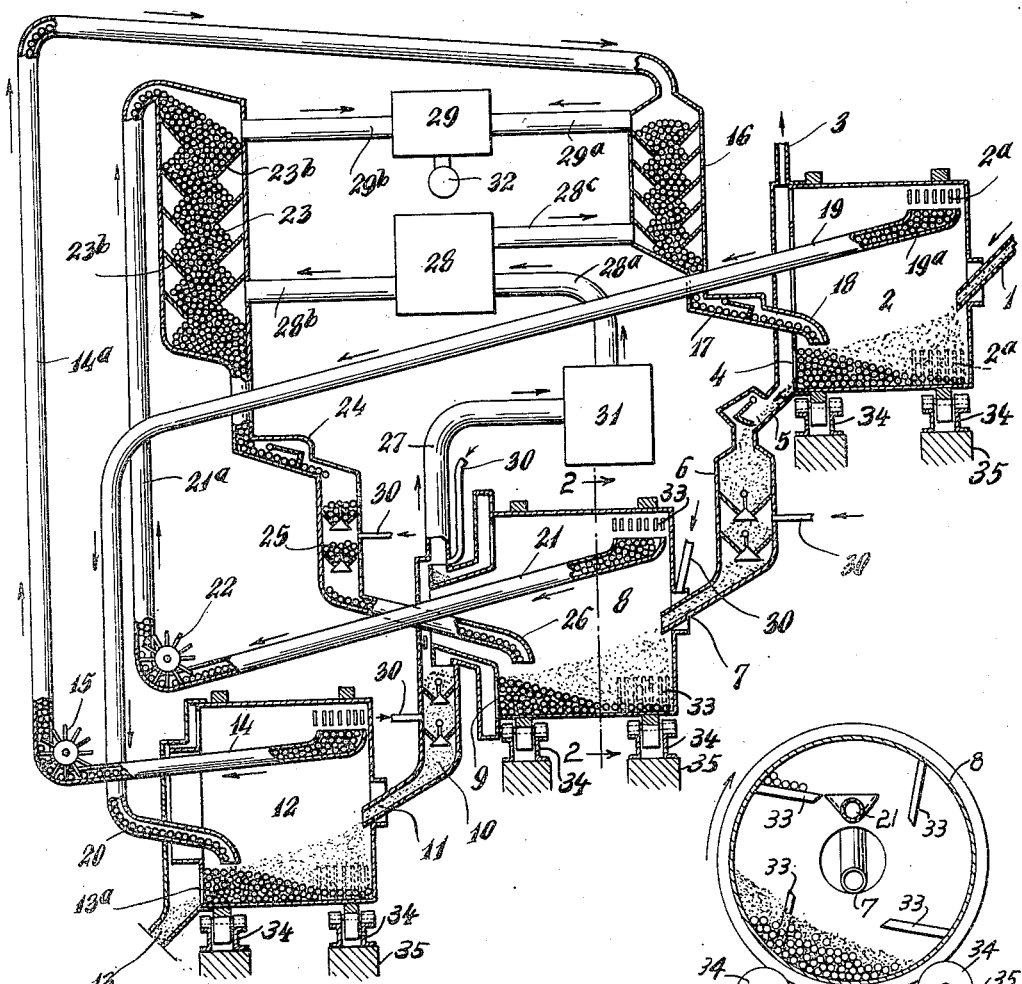

May 13, 1947.  E. A. JOHANSSON  2,420,376
DESTRUCTIVE DISTILLATION PROCESS EMBODYING
COUNTER FLOW OF SOLID HEATING MEDIUM
Filed Feb. 21, 1945

INVENTOR.
Edvin A. Johansson
BY Haseltine, Lake & Co.
ATTORNEYS.

Patented May 13, 1947

2,420,376

UNITED STATES PATENT OFFICE 2,420,376

DESTRUCTIVE DISTILLATION PROCESS EMBODYING COUNTERFLOW OF SOLID HEATING MEDIUM

Edvin Andreas Johansson, Stockholm, Sweden

Application February 21, 1945, Serial No. 579,045 In Sweden July 20, 1942

9 Claims. (Cl. 202—14)

1

The present invention relates to an improved method of dry distillation of such materials as bituminous shales and the like, peat, saw-dust, chips of wood, coal and other distillable substances, but is especially related to dry distillation of oil-bearing shales.

The object of the invention is to so improve hitherto used methods of dry distillation that besides an efficient carrying out of the dry distillation itself and taking care of the condensable ingredients of the gases driven off, for example oil and sulphur from oil-bearing shales, a very good thermal economy is reached.

The method according to the invention comprises preheating the material to be treated in a first separate step, dry-distilling the preheated material in a second separate step, heating heat-carrying and heat-delivering loose bodies by means of heat obtained from products formed during the dry-distillation, said preheating and said dry-distillation being carried out by bringing the material in direct contact with and in motion in relation to such heated heat-carrying and heat-delivering loose bodies in separate rotating drums, into and out of which the heat carrying bodies and the material to be treated are supplied and discharged separately at opposite ends of the drums in such manner that they, due to the stirring and mixing caused by the rotation of the drum, are moved through the drum transversely to the rotation and in counter-current to each other.

According to the invention a part of the reheating of cooled heat-carrying bodies may be effected by means of the heat of hot residues from the dry distillation. This reheating of the heat-carrying bodies is carried out in a separate rotating drum in a similar manner as the preheating and dry distillation, i. e. cooled heat-carrying bodies and hot residues from the dry distillation are supplied and discharged separately at opposite ends of the rotating drum and moved automatically in counter-current to each other through the rotating drum.

This method may further be so carried out that the heat-carrying bodies and the material to be distilled or the residues of distillation, when the operation has become continuous, are introduced intermittently at determined intervals in quantities which each time are only a minor fraction of the total quantities of the same material in the drum, and that corresponding quantities of heat-carrying bodies and the material to be distilled or residues of distillation are continuously or intermittently discharged from the drum.

2

According to the invention the two heat-exchanging materials are suitably sluiced into and out of the dry-distilling rotating drum.

To reheat the heat-carrying bodies one may utilise, besides the hot residues of distillation, also heat obtained by combusting combustible gases developed during the dry distillation, solid and condensable ingredients being first removed from such gases.

Figure 2:
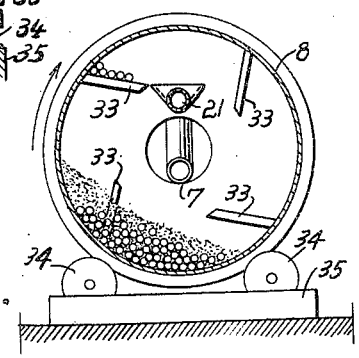

The invention will be more fully described hereinafter in connection with the accompanying drawing in which:

Figure 1 shows a diagrammatic view of a plant for carrying out the method according to the invention; and Fig. 2 is a cross-sectional view along the line 2—2 of Fig. 1.

According to the diagrammatic view of Fig. 1, three rotatable drums 2, 8 and 12, are arranged to be rotatably supported for example on rollers 34 and bases 35. In the drum 2 the raw material is dried and preheated. In the drum 8 the dry distillation is carried out, while the drum 12 is used for reheating heat-carrying bodies by means of the heat of the residues from the distillation in the drum 8.

The raw material after being crushed to a suitable piece or grain size is supplied through the conduit 1 centrally through an opening in a side wall of the drum 2. The ball-shaped heat-carrying bodies are supplied by the conduit 18 through the opposite end wall of the drum under control of a time-controlled measurer of quantity 17.

The expelled moisture is led away through the conduit 3. The preheated raw material is discharged through the screen openings 4 under control of a time-controlled measurer of quantity 5 and arrives to a time-controlled double sluice 6, from which the material intermtitently is fed through the conduit 7 into the rotating drum 8, in which the dry distillation is carried out. The cooled heating balls in the drum 2 are lifted and transported by the screens 2a secured to the inside of the drum so that they roll or slide off into the inlet 19a of an inclined channel, tube, or conduit 19, through which they are moved by their own weight down to the intake 20, through which they are admitted into the rotating drum 12 to be reheated.

The balls after being heated to a very high temperature are supplied to the drum 8 through the intake 26 from a time-controlled double sluice 25. They are supplied in such quantities and at such a temperature that the dry distillation of the preheated raw material, which is supplied through the conduit 7, may be carried out, while the raw material and the balls are moving in countercurrent through the drum. The gases driven out during the dry distillation are led away through the conduit 27 to devices 31 for condensing and separating the condensable and solid ingredients of the gases, such as oil and sulphur from oil-bearing shales. The combustible gases now being substantially delivered from such substances are conveyed through the conduit 28a to a furnace 28, in which these gases are combusted for the purpose of utilising their heat of combustion.

The balls cooled off in the drum 8 are lifted and transported by the screens 33 mounted on the inside of the drum 8 so that the balls roll or slide off into the inlet or mouth of inclined channel or conduit 21 through which they are conveyed away by means of a lifting device 22 and the conduit 21a to the upper end of a tower-like heater 23, in which they are reheated to the temperature necessary for the dry distillation. For this purpose hot gases of combustion from the furnace 28 are conveyed through the conduit 28b into the lower part of the heater 23, in which they rise meeting the balls, which are moving downwards by their own weight. To adapt the velocity downwards of the balls through the tower 23 to a value suitable for the heating of the balls, downwardly inclined shelves 23b are secured to opposite walls of the tower and so arranged that the path of the balls through the tower will be zigzag-shaped. The reheated balls are discharged from the lower part of the tower 23 under control of a time-controlled measurer of quantity 24 and are then conveyed to the time-controlled double sluice 25, from which the intake 26 is branched off.

The residues from the material finally treated in the drum 8 are discharged through the screen openings 9 and are conveyed to a time-controlled double sluice 10, from which the hot residues intermittently are supplied to the drum 12, which they pass in countercurrent to the cool balls supplied by the intake 20, whereby the latter are reheated. The cooled residues are discharged through the screen openings 13a to the pipe connection 13 and are led away for combustion, treatment, storage or other purpose.

The reheated balls are automatically lifted and supplied to the inclined conduit 14 in the above described way and are transported further by a lifting device 15 and the conduit 14a to the upper end of a heating tower 16, which is arranged in a similar manner as the heating tower 23, and in which the downwardly moving balls meet a rising current of hot gases of combustion, which are supplied to the lower part of the tower 16 through the conduit 28c from the furnace 28. The hereby finally heated balls are conveyed through the time-controlled measurer of quantity 17 to the intake 18 for balls leading to the preheating drum 2. The hot exhaust gases from the heating towers 16 and 23 are conveyed through the conduits 29a and 29b respectively to a boiler or other heating plant 29 and are finally discharged through a chimney 32.

The packings and the double sluices 6, 10, and 25 of the dry-distilling drum 8 are sealed against the leakage of gases from and the penetration of air into the drum by means of steam conduits 30, which put them under increased pressure.

The rotatable drums 2, 8, and 12 may be placed at such different levels that the material to be distilled is fed by its own weight from the uppermost drum 2 to the middle drum 8 and thence to the lowermost drum 12, while the heat-carrying balls likewise are transported by their own weight through the inclined conduits 19, 21, 14, 18, 26, and 20. Thus, the material to be distilled needs to be transported mechanically only to the uppermost drum 2 by means of an elevator, whereas the balls are transported by the lifting devices 15, 22 to the tops of the heating towers 23 and 16, from where they again are moving downwards by their own weight.

For all the heating only heat from products derived in the process is used, and the gases are combusted first after separating condensable and solid ingredients, such as oil and sulphur. No extra fuel is necessary in the dry distillation of oil-bearing shales, but instead a certain heat surplus is obtained, which is utilised in the boiler 29.

As an example of carrying out the dry distillation of oil-bearing shales according to the invention, the following data may be given.

The oil-bearing shale is supplied to the preheating drum 2 at a temperature normally varying between $-20°$ and $+20°$ C., while the iron balls are supplied through the conduit 18 at a temperature of $350°$. Steam of $100°$ leaves through the conduit 3, and preheated raw material of about $325°$ is conveyed through the double sluice 6 into the dry-distilling drum 8, into which iron balls are supplied through the conduit 26 at a temperature of about $600°$. The residues from the dry distillation are conveyed into the reheating drum 12 at a temperature of about $500°$ and heat therein the cooled balls that have been conveyed to the drum 12 from the drum 2 by the conduit 19, 20. The entering balls have a temperature of about $25°$ and are heated to about $200°$, whereupon the balls through the conduit 14 are transported to the heating tower 16, in which they are finally heated to about $350°$, before they again are supplied to the preheating drum 2.

In the dry-distilling drum 8 the balls are cooled to about $375°$ and are then transported to the heating tower 23, in which they are reheated to about $600°$, before they are again admitted to the drum 8.

The gases containing oil and sulphur leaving through the conduit 27 have a temperature of about $400°$. Through the conduit 28b gases of about $700°$ are conveyed to the tower 23, whereas the conduit 28c conveys gases of about $450°$ to the tower 16.

In the described plant the heating balls are divided in two groups that are never intermingled. One group of balls circulates between the preheating drum 2, the reheating drum 12 and the heating tower 16, while the other group of balls circulates between the dry-distilling drum 8 and the heating tower 23.

The above described plant may be modified by connecting the discharge conduit 21 for cooled heating bodies to the preheating drum 2, either directly or, if desired, over some extra heating device. In the modified plant the discharge conduit 14, 14a for reheated heating bodies from the reheating drum is connected to the heater 23, in which the heating bodies are finally reheated to the temperature necessary for the dry distillation, for example by means of heat from combustible gases formed during the dry distillation, which heater also is connected to the inlet conduit for heating bodies of the dry-distilling drum 8.

In this modified plant the heating bodies will circulate in sequence through the dry-distilling drum 8, the preheating drum 2, the reheating drum 12, and the final heater 23 back to the dry-distilling drum 8. The heater 16 may then either be omitted or greatly reduced in size.

To carry out this modification, the following changes must be made:

The discharge conduit 21 from the dry-distilling drum 8 for cooled heating bodies is not connected to the heater 23 but is instead connected to the inlet conduit 17 for heating bodies of the preheating drum 2. The heating bodies leaving the dry-distilling drum have namely in most cases a sufficiently high temperature for carrying out the preheating in the drum 2 without being further heated, wherefore the heater 16 may be omitted. Further, the discharge conduit 14, 14a from the reheating drum 12 for reheated heating bodies is now connected to the upper end of the heating tower 23 instead of being connected to the heater 16. The conduit 21a will of course also be omitted.

Having now particularly described the nature of my invention and the manner of its operation what I claim is:

1. A method of dry distillation, comprising preheating the material to be treated in a first separate step, dry-distilling the preheated material in a second separate step, heating heat-carrying and heat-delivering loose bodies by means of heat obtained from products formed during the dry-distillation, said preheating and said dry-distillation being carried out by bringing the material in direct contact with and in motion in relation to such heated heat-carrying and heat-delivering loose bodies in separate rotating drums, into and out of which the heat-carrying bodies and the material to be treated are supplied and discharged separately at opposite ends of the drums in such manner that they, due to the stirring and mixing caused by the rotation of the drum, are moved through the drum transversely to the rotation and in counter-current to each other.

2. A method of dry distillation, comprising preheating the material to be distilled in a first separate step, dry-distilling the preheated material in a separate second step, heating heat-carrying and heat-delivering loose bodies by means of heat obtained from products formed during the dry-distillation, a part of said heating of the heat carrying bodies being effected by means of hot residues from the dry-distillation, said preheating, said dry-distillation, and said heating of heat-carryng bodies by means of hot residues being carried out by bringing the material in direct contact with and in motion in relation to said loose bodies in separate rotating drums into and out of which said loose bodies and the material to be treated are supplied and discharged separately at opposite ends of the drums in such manner that they, due to the stirring and mixing caused by the rotation of the drum, are moved through the drum transversely to the rotation and in countercurrent to each other.

3. A method of dry distillation according to claim 2, and in which the heat-carrying bodies, the material to be treated, and the residues after the dry distillation are fed intermittently into the respective rotating drum at determined intervals and in a quantity each time that is only a minor fraction of the total quantity of such material present in the drum, and in which corresponding quantities of heat-carrying bodies, material to be treated, and residues from the dry-distillation are discharged from the respective drum.

4. A method of dry distillation according to claim 1, and in which the two heat-exchanging materials are sluiced into and out of the rotating drum used for dry-distillation.

5. A method of dry distillation according to claim 1, and in which hot residues from the dry-distillation and heat obtained by combustion of gases formed during the dry-distillation are utilised for reheating said heat-carrying bodies, solid and condensable ingredients in said gases being first removed before such combustion.

6. A method of dry distillation according to claim 2, and in which also heat obtained by combustion of gases formed during the dry-distillation after removal of solid and condensable ingredients are used for reheating said heat-carrying bodies.

7. A method of dry distillation according to claim 1, and in which said heat-carrying and heat-delivering bodies pass from the drum for heating said bodies to the drum for the dry distillation of the material to be treated and therefrom to the drum for preheating said material and then return to the drum for heating said bodies.

8. A method of dry distillation according to claim 1 in which such heat-carrying and heat-delivery bodies pass from the drum for heating said bodies to the drum for the dry distillation of the material to be treated and therefrom to the drum for preheating said material and then return to the drum for heating said bodies and in which said bodies are further heated on their way between the drum for heating said bodies and the drum for preheating said material.

9. A method of dry distillation according to claim 1, and in which said bodies are heated by means of combustion of solid residues resulting from the distillation of said material.

EDVIN ANDREAS JOHANSSON.

REFERENCES CITED

The following references are of record in the file of this patent:

UNITED STATES PATENTS

| Number | Name | Date |
| --- | --- | --- |
| 1,712,082 | Kopper | May 7, 1929 |
| 846,958 | Sheldon | Mar. 12, 1907 |
| 1,698,345 | Puening | Jan. 8, 1929 |

FOREIGN PATENTS

| Number | Country | Date |
| --- | --- | --- |
| 305,106 | Great Britain | Jan. 28, 1929 |
| 189,542 | Great Britain | Dec. 1, 1922 |